United States Patent
Murphy et al.

(10) Patent No.: US 8,718,733 B2
(45) Date of Patent: May 6, 2014

(54) SUPERCONDUCTING FAULT CURRENT LIMITER RECOVERY SYSTEM

(75) Inventors: Paul J. Murphy, Reading, MA (US); Gary E. Dickerson, Gloucester, MA (US)

(73) Assignee: Varian Semiconductor Equipment Associates, Inc., Gloucester, MA (US)

( * ) Notice: Subject to any disclaimer, the term of this patent is extended or adjusted under 35 U.S.C. 154(b) by 37 days.

(21) Appl. No.: 13/485,550

(22) Filed: May 31, 2012

(65) Prior Publication Data

US 2012/0316069 A1    Dec. 13, 2012

Related U.S. Application Data

(60) Provisional application No. 61/495,192, filed on Jun. 9, 2011.

(51) Int. Cl.
  *H01L 39/24*    (2006.01)
(52) U.S. Cl.
  USPC .......................................................... 505/220
(58) Field of Classification Search
  USPC .................................. 505/150, 850
  See application file for complete search history.

(56) References Cited

U.S. PATENT DOCUMENTS

2008/0103051 A1*    5/2008    Park et al. ............... 505/220

FOREIGN PATENT DOCUMENTS

| EP | 0926797 | * | 6/1999 |
| EP | 0926797 A2 | | 6/1999 |
| GB | 2439764 | * | 1/2008 |
| GB | 2439764 A | | 1/2008 |
| WO | 2010081162 A1 | | 7/2010 |
| WO | WO2010081162 | * | 7/2010 |

* cited by examiner

Primary Examiner — Colleen Dunn

(57) ABSTRACT

A superconducting fault current limiter recovery system includes a superconducting fault current limiter, a shunt electrically coupled in parallel with the superconducting fault current limiter, and a bypass path also electrically coupled in parallel with the superconducting fault current limiter. The bypass path enables a load current to flow through the bypass path during a bypass condition. Thus, load current may be quickly reestablished to serve loads after a fault condition via the bypass path while a superconductor of the superconductor fault current limiter has time to return to a superconducting state after the fault condition.

16 Claims, 4 Drawing Sheets

SUPERCONDUCTING FAULT CURRENT LIMITER RECOVERY SYSTEM

CROSS REFERENCE TO RELATED APPLICATIONS

This application claims the benefit of provisional patent application No. 61/495,192, filed Jun. 9, 2011, which is incorporated herein by reference.

FIELD

This disclosure relates to superconducting fault current limiters, and more particularly to a superconducting fault current limiter recovery system.

BACKGROUND

A superconducting fault current limiter (SCFCL) is a device that limits fault currents in a power system. The power system may include transmission and distribution networks to deliver power to differing industrial, commercial, and residential loads. A fault current is an abnormal current in an electrical circuit due to a fault such as a short circuit resulting in a short circuit current. A fault current may occur due to any number of events or failures such as severe weather damaging power lines and components, e.g., lighting striking the power system. When faults occur, a large load appears instantaneously. The network, in response, delivers a large amount of current (i.e. fault current) to this load or, in this case, the faults. This surge or fault current condition is undesirable since it may damage the network or equipment connected to the network.

A SCFCL includes a superconductor positioned in a cryogenic tank. The superconductor is in a superconducting state having zero resistance during a steady state condition. To maintain the superconductor in the superconducting state, the superconductor is operated below its critical temperature, critical current density, and critical magnetic field. If any one of these three is exceeded, the superconductor quenches from its superconducting state to a normal state and exhibits a resistance. To maintain the superconductor at a temperature below its critical temperature, a refrigeration system provides a cryogenic cooling fluid to the cryogenic tank housing the superconductor.

FIG. 1 is a circuit diagram of one power system 100 of the prior art. The power system 100 includes a SCFCL 106, an AC power generator 102, a shunt 114 in parallel with the SCFCL 106, a circuit breaker 108 which is normally closed, and differing loads 110. Under steady state conditions, the AC power generator 102 provides power to the loads 110. The circuit breaker 108 is closed and load current flows through conductor 103, the SCFCL 106, and conductor 105 to the loads 110. The superconductor of the SCFCL 106 is in a superconducting state exhibiting zero resistance during the steady state condition. A fault condition may occur as illustrated by the inadvertent path to ground at location 112. In response, the AC power generator 102 attempts to deliver a large amount of fault current. The superconductor quenches and exhibits a resistance much larger than the resistance of the shunt 114. Hence, the fault current is commutated into the shunt 114 which limits the fault current to an acceptable level by reducing the peak to peak value of the fault current before the circuit breaker 108 can open (a conventional circuit breaker 108 typically takes 2 to 3 cycles before opening when operating at a conventional 60 Hz).

Although the power system 100 is effective, it is sometimes necessary for the power system 100 to quickly recover from fault conditions. However, the SCFCL 106 may not be prepared to quickly return to normal protective operations. For instance, the superconductor of the SCFCL 106 may increase in temperature to a level above its critical temperature during the fault condition. The temperature of the superconductor must be returned to a level below its critical temperature in order to return to its superconducting state. An associated refrigeration system takes time to cool the superconductor back to a temperature below its critical temperature. This delays return to the steady state condition and may delay closing of the circuit breaker 108 after recovery from a fault condition.

Accordingly, there is a need in the art for an SCFCL recovery system that overcomes the above-described inadequacies and shortcomings.

SUMMARY

According to a one aspect of the disclosure, a superconducting fault current limiter recovery system is provided. The superconducting fault current limiter recovery system includes a superconducting fault current limiter, a shunt electrically coupled in parallel with the superconducting fault current limiter, and a bypass path also electrically coupled in parallel with the superconducting fault current limiter.

According to another aspect of the disclosure, another superconducting fault current limiter recovery system is provided. The superconducting fault current limiter recovery system includes a superconducting fault current limiter, a shunt electrically coupled in parallel with the superconducting fault current limiter, a bypass path also electrically coupled in parallel with the superconducting fault current limiter, the bypass path having a first switch, a second switch electrically coupled in series with the superconducting fault current limiter, the second switch also electrically coupled in parallel with the bypass path, and a controller. The controller is configured to control a state of the first switch and the second switch to open the first switch and close the second switch during a steady state condition so a load current flows through the superconducting fault current limiter during the steady state condition, and to close the first switch and open the second switch during a bypass condition occurring after a fault condition so the load current flows through the bypass path during the bypass condition.

BRIEF DESCRIPTION OF THE DRAWINGS

For a better understanding of the present disclosure, reference is made to the accompanying drawings, in which like elements are referenced with like numerals, and in which.

DETAILED DESCRIPTION

Figure 1:
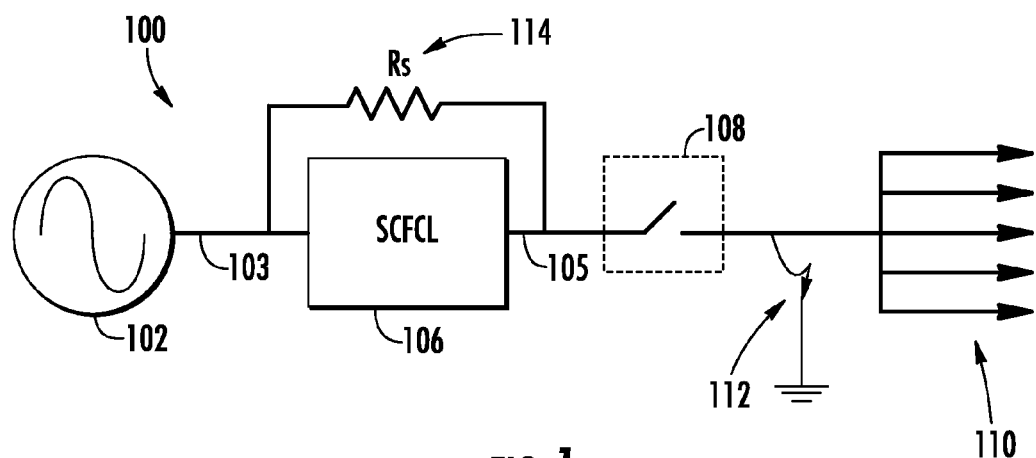
FIG. 1 is a diagram of a SCFCL power system of the prior art.

The present invention will now be described more fully hereinafter with reference to the accompanying drawings, in which embodiments of the invention are shown. This invention, however, may be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout.

Figure 2:
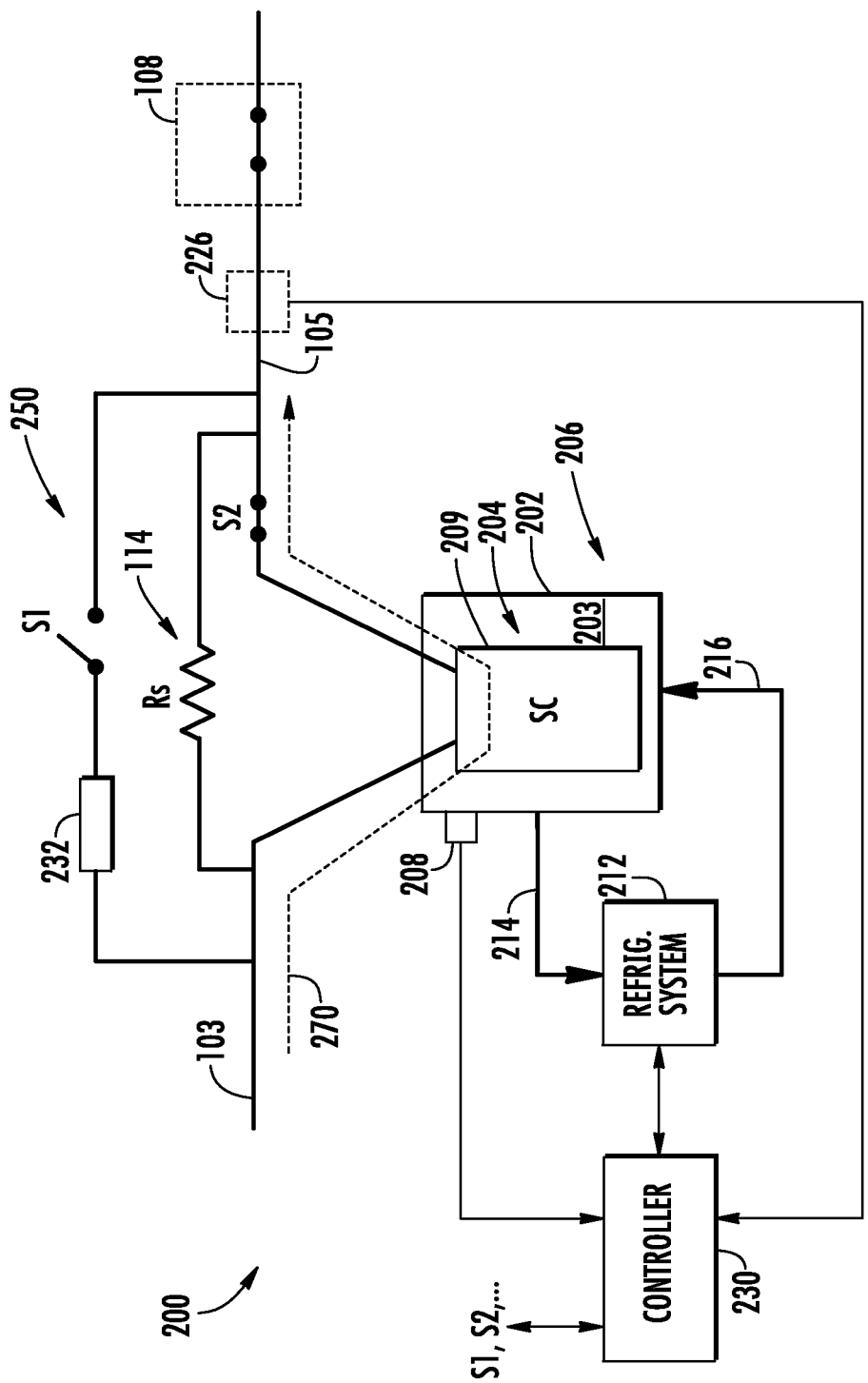
FIG. 2 is a diagram of a SCFCL recovery system consistent with an embodiment of the disclosure operating in a steady state condition.

Turning to FIG. 2, a block diagram of a SCFCL recovery system 200 consistent with an embodiment of disclosure is illustrated. The SCFCL recovery system 200 may include a bypass path 250 electrically coupled in parallel with the SCFCL 206. The bypass path may include a first switch S1 and a fuse 232 electrically coupled in series with the first switch S1. The SCFCL recovery system 200 may also include a SCFCL 206, and the shunt 114 also electrically coupled in parallel with the SCFCL 206. The shunt 114 is schematically illustrated as a resistor but may also be an inductor in other embodiments. The SCFCL system 200 may also include a second switch S2 and a controller 230. The second switch S2 is electrically coupled in series with the SCFCL 206 and in parallel with the bypass path 250.

Only selected portions of the SCFCL 206 are illustrated and those skilled in the art will recognize the SCFCL 206 may include other components. The SCFCL 206 may include a cryogenic tank 202 defining a chamber 203, a superconductor 209 positioned in the chamber 203, a refrigeration system 212, a temperature sensor 208, and a current sensor 226. For clarity of illustration, only one SCFCL 206 for one phase is illustrated. Those skilled in the art will recognize that there may be three SCFCLs (one for each phase) of a three phase AC power system.

The cryogenic tank 202 may be fabricated of differing materials such as dielectric materials and/or thermally insulating materials. The superconductor 209 may be any type of superconducting material such as yttrium barium copper oxide (YBCO) that exhibits superconducting properties when held below its critical temperature, critical current density, and critical magnetic field. The superconductor 209 may have different modules depending on the amount of superconducting material required. The refrigeration system 212 is configured to provide a cryogenic liquid to the cryogenic tank 202 via a supply conduit 216 and to receive the same via a return conduit 214. The refrigeration system 212 may include a cryogenic cooling unit to cool the input cryogenic fluid received from the return conduit 214 before providing cooled cryogenic fluid back via the supply conduit 216. The refrigeration system 212 may include valves, pumps, and sensors. The refrigeration system 212 may also include a storage tank to store additional cryogenic cooling fluid. The cryogenic cooling fluid may be liquid nitrogen, liquid helium, liquid argon, liquid neon, etc. and/or mixtures of the same.

The controller 230 can be or include a general-purpose computer or network of general-purpose computers that may be programmed to perform desired input/output functions. The controller 230 can also include other electronic circuitry or components, such as application specific integrated circuits, other hardwired or programmable electronic devices, discrete element circuits, etc. The controller 230 may also include communication devices, data storage devices, and software. The controller 230 may receive input signals from a variety of systems and components such as the first switch S1, the second switch S2, the refrigeration system 212, the temperature sensor 208, the current sensor 226, etc. to determine a condition of one or more components and also to control the same. The temperature sensor 208 is illustrated as being on the outside of the cryogenic tank 202 but may be positioned in other locations as well to monitor the temperature of the superconductor 209 and/or the cryogenic cooling fluid inside the chamber 203. The current sensor 226 may be positioned to monitor in real time the current draw on conductor 105. Any type of current sensor may be utilized such as a current transformer positioned about the conductor 105. The fuse 232 may be an electrical protection device selected to provide protection to loads when current is bypassing the SCFCL 206. In one embodiment, the fuse 232 may include a superconductor that electrically opens if a fault occurs during a bypass condition when load current is flowing through the bypass path 250.

In operation, during a steady state condition the superconductor 209 is in a superconducting state. The refrigeration system 212 provides a cryogenic liquid to the cryogenic tank 202 via the supply conduit 216 and receives return cryogenic liquid to be re-cooled via the return conduit 214. The temperature of the superconductor 209 remains below its critical temperature. The critical temperature may be between about 77° K and 93° K for high temperature superconductors.

During this steady state condition, the controller 230 maintains the first switch S1 (normally open) in an open state and the second switch S2 (normally closed) in a closed state as illustrated in FIG. 2. Accordingly, a load current flows through the SCFCL 206 along path 270 to the loads of the system 200 during the steady state condition.

During a fault condition, a fault current causes the temperature of the superconductor 209 to nearly instantaneously exceed its critical temperature, and hence the superconductor 209 quenches. The superconductor 209 in this state exhibits a much higher resistance than the shunt 114. Hence, the fault current is commutated through the shunt 114 which effectively limits the peak to peak value of the fault current before the circuit breaker 108 is opened.

Figure 3:
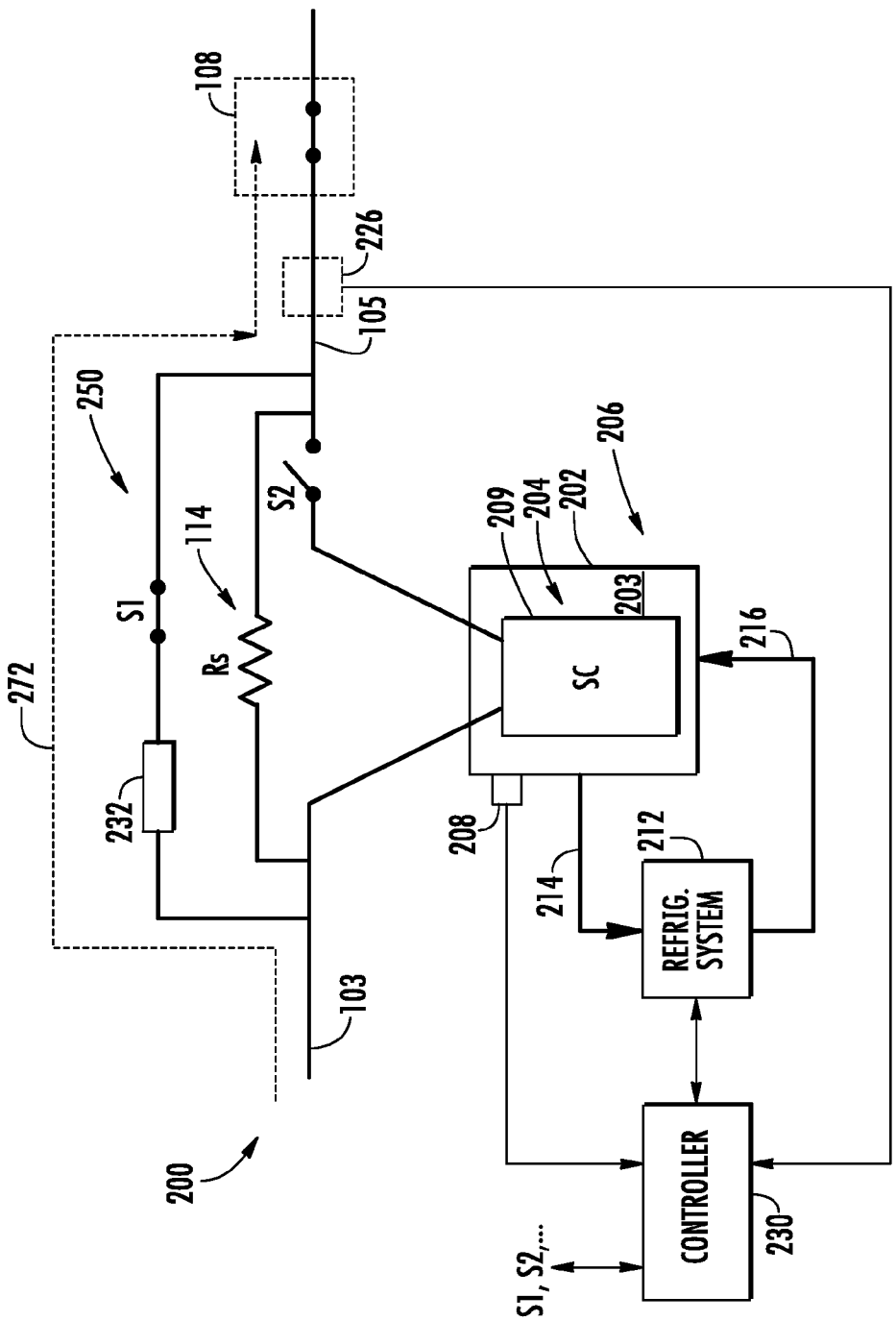
FIG. 3 is a diagram of the SCFCL recovery system of FIG. 2 operating in a bypass condition.

Turning to FIG. 3, the SCFCL recovery system 200 is illustrated operating during a bypass condition which occurs after the fault condition. During the bypass condition, the controller 230 is configured to cause the first switch S1 to close and the second switch S2 to open. The bypass condition may be initiated in response to a monitored condition representative of dissipation in the fault current. For example, the current sensor 226 may provide a signal to the controller 230 representative of dissipation in the fault current. The bypass condition may also be initiated in response to the re-closing of the circuit breaker 108. When the first switch S1 is closed and the second switch S2 is open, load current will flow through the bypass path 250 to the loads as illustrated by path 272.

During this bypass condition (with the first switch S1 closed and the second switch S2 open as illustrated in FIG. 3), the SCFCL 206 has an additional recovery time interval to return the superconductor 209 to a superconducting state. In one instance, the superconductor 209 may need to be re-cooled by the refrigeration system 212 back down below its critical temperature to return it to its superconducting state. The controller 230 may wait a predetermined recovery time interval after initiating the bypass condition to enable the SCFCL 206 to return to a superconducting state before switching back to the steady state condition. Alternatively, the controller 230 may be responsive to a monitored condition representative of a superconducting state of the superconductor 209 before terminating the bypass condition and returning to the steady state condition. For instance, the temperature sensor 208 may provide a signal to the controller 230 representative of the temperature of the superconductor 209. Once this temperature is below the critical temperature of the superconductor 209, the controller 230 may initiate termination of the bypass condition (FIG. 3) and a return to the steady state condition (FIG. 2) by opening the first switch S1 and closing the second switch S2.

If a fault occurs during the bypass condition when the first switch S1 is closed and the second switch S2 is open, the fuse 232 may blow or open causing fault current to be commutated back through the shunt 114 before the circuit breaker 108 re-opens. As earlier detailed, in one embodiment the fuse 232 may be an electrical protection device selected to provide protection to loads during this bypass condition. In one embodiment, the fuse 232 may include a superconductor that electrically opens if a fault occurs during the bypass condition.

Figure 4:
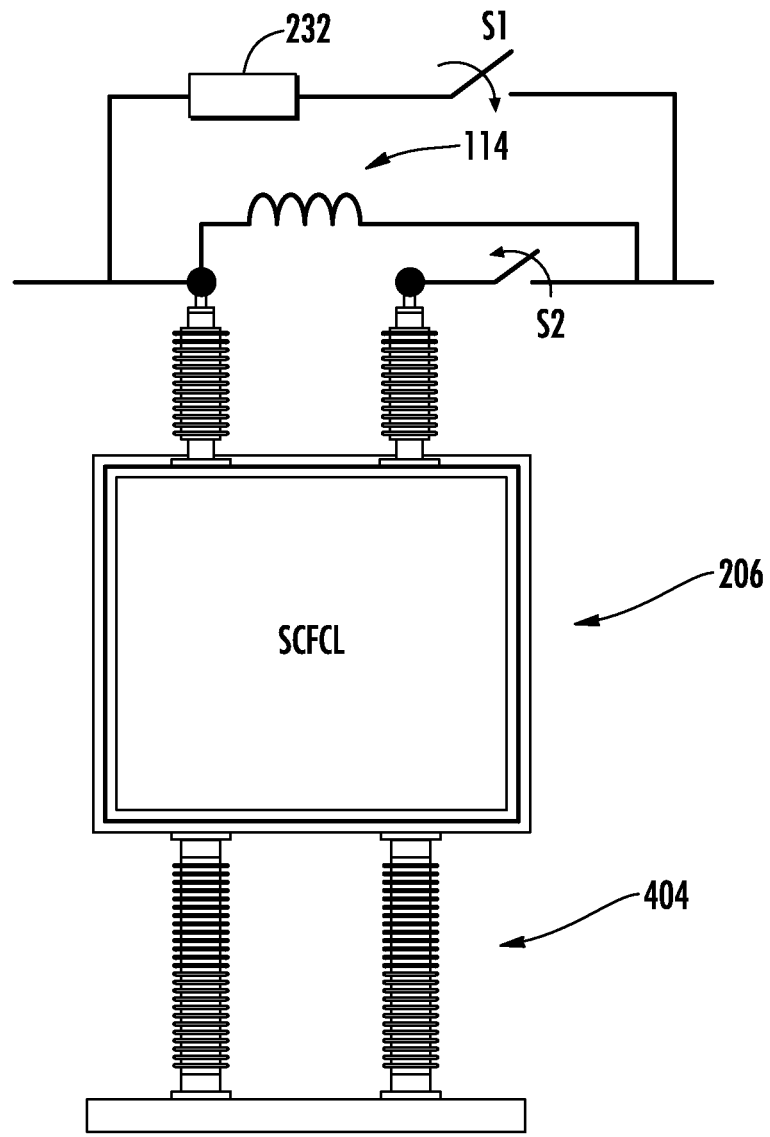
FIG. 4 is a diagram of another SCFCL recovery system consistent with an embodiment of the disclosure.

FIG. 4 is a block diagram of another embodiment of the disclosure consistent with FIGS. 2 and 3 illustrating the SCFCL 206 on insulating pedestals 404.

Accordingly, there has been provided a SCFCL recovery system having a bypass path electrically coupled in parallel with a SCFCL. The bypass path may include a first switch S1 operable to selectively employ the bypass path. Advantageously, the bypass path enables the SCFCL to be bypassed for a recovery time interval as it returns the superconductor to a superconducting state after a fault condition. In this way, the time for recovery after a fault condition is minimized. In one example, the time to recover from a fault condition may be on the order of only milliseconds as opposed to seconds. While the bypass path is utilized, the a refrigeration system of the SCFCL may cool a heated superconductor back down below its critical temperature before the SCFCL recovery system returns to a steady state condition.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes.

What is claimed is:

1. A superconducting fault current limiter recovery system comprising:
    a superconducting fault current limiter;
    a shunt electrically coupled in parallel with the superconducting fault current limiter;
    a bypass path also electrically coupled in parallel with the superconducting fault current limiter, the bypass path including a first switch;
    a second switch electrically coupled in series with the superconducting fault current limiter, the second switch also electrically coupled in parallel with the bypass path; and
    a controller configured to control a state of the first switch and the second switch, wherein the controller is configured to open the first switch and close the second switch after a recovery time interval sufficient to enable the superconductor to return to a superconducting state after a fault condition occurs.

2. The superconducting fault current limiter recovery system of claim 1, wherein the first switch is open during a steady state condition so a load current flows through the superconducting fault current limiter during the steady state condition.

3. The superconducting fault current limiter recovery system of claim 2, wherein the first switch is closed during a bypass condition occurring after the fault condition so the load current flows through the bypass path during the bypass condition.

4. The superconducting fault current limiter recovery system of claim 3, wherein the second switch is open during the bypass condition.

5. The superconducting fault current limiter recovery system of claim 4, wherein the superconductor fault current limiter comprises a superconductor disposed in a chamber of a cryogenic tank.

6. The superconducting fault current limiter recovery system of claim 5, wherein the controller is configured to control the state of the first switch and the second switch in response to a monitored condition representative of the superconducting state of the superconductor.

7. The superconducting fault current limiter recovery system of claim 6, wherein the monitored condition is a temperature of the superconductor.

8. The superconducting fault current limiter recovery system of claim 7, wherein the controller is configured to terminate the bypass condition and initiate the steady state condition once the temperature of the superconductor is cooled below a critical temperature of the superconductor.

9. The superconducting fault current limiter recovery system of claim 6, wherein the controller is configured to terminate the bypass condition and initiate the steady state condition after the superconductor has returned to the superconducting state.

10. The superconducting fault current limiter recovery system of claim 1, wherein the bypass path comprises a fuse electrically coupled in series with the first switch.

11. A superconducting fault current limiter recovery system comprising:
    a superconducting fault current limiter;
    a shunt electrically coupled in parallel with the superconducting fault current limiter;
    a bypass path also electrically coupled in parallel with the superconducting fault current limiter, the bypass path having a first switch;
    a second switch electrically coupled in series with the superconducting fault current limiter, the second switch also electrically coupled in parallel with the bypass path; and
    a controller configured to control a state of the first switch and the second switch to open the first switch and close the second switch during a steady state condition so a load current flows through the superconducting fault current limiter during the steady state condition, and to close the first switch and open the second switch during a bypass condition occurring after a fault condition so the load current flows through the bypass path during the bypass condition,
    the controller further configured to maintain the bypass condition for a recovery time interval sufficient to enable the superconductor to return to a superconducting state after the fault condition.

12. The superconducting fault current limiter recovery system of claim 11, wherein the superconductor fault current limiter comprises a superconductor disposed in a chamber of a cryogenic tank.

13. The superconducting fault current limiter recovery system of claim 12, wherein the controller is configured to control the state of the first switch and the second switch in response to a monitored condition representative of the superconducting state of the superconductor.

14. The superconducting fault current limiter recovery system of claim 13, wherein the controller is configured to terminate the bypass condition and initiate the steady state condition after the superconductor has returned to the superconducting state.

15. The superconducting fault current limiter recovery system of claim 13, wherein the monitored condition is a temperature of the superconductor, and the controller s configured to terminate the bypass condition and initiate the steady state condition once the temperature of the superconductor is cooled below a critical temperature of the superconductor.

16. The superconducting fault current limiter recovery system of claim 11, wherein the bypass path comprises a fuse electrically coupled in series with the first switch.

\* \* \* \* \*